United States Patent
Zhao et al.

(10) Patent No.: US 11,477,018 B2
(45) Date of Patent: Oct. 18, 2022

(54) METHOD, DEVICE AND SYSTEM FOR ENCRYPTING INTERACTIVE DATA

(71) Applicant: BOE TECHNOLOGY GROUP CO., LTD., Beijing (CN)

(72) Inventors: Kai Zhao, Beijing (CN); Lingfeng Xu, Beijing (CN); Hongyan Pei, Beijing (CN); Pan Ni, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 246 days.

(21) Appl. No.: 16/825,754

(22) Filed: Mar. 20, 2020

(65) Prior Publication Data
US 2021/0135863 A1   May 6, 2021

(30) Foreign Application Priority Data
Oct. 30, 2019 (CN) .......................... 201911042048.8

(51) Int. Cl.
*H04L 9/40* (2022.01)
*H04L 9/08* (2006.01)
(Continued)

(52) U.S. Cl.
CPC .......... *H04L 9/0869* (2013.01); *H04L 9/0662* (2013.01); *H04L 9/0894* (2013.01);
(Continued)

(58) Field of Classification Search
CPC ....... H04L 9/08; H04L 9/0869; H04L 9/0894; H04L 9/0866; H04L 9/06; H04L 9/0662;
(Continued)

(56) References Cited

U.S. PATENT DOCUMENTS

| 8,249,611 B1 * | 8/2012 | Sarkar ................... H04W 48/06 455/452.1 |
| 10,445,136 B1 * | 10/2019 | Roskind ................ G06F 9/4881 |
| 2004/0098748 A1 * | 5/2004 | Bo ........................ H04L 1/0002 725/105 |

(Continued)

FOREIGN PATENT DOCUMENTS

| CN | 104936176 A | 9/2015 |
| CN | 105577680 A | 5/2016 |

(Continued)

OTHER PUBLICATIONS

Office Action dated Dec. 31, 2021 issued in corresponding Chinese Application No. 201911042048.8.

*Primary Examiner* — Shaqueal D Wade-Wright
(74) *Attorney, Agent, or Firm* — Nath, Goldberg & Meyer; Joshua B. Goldberg

(57) ABSTRACT

The disclosure provides a method, a device and a system for encrypting interactive data. In an aspect, the method includes: receiving a request for accessing a network from a terminal device, the request includes a device identifier of the terminal device; generating a random encryption code according to the device identifier; and feeding back the random encryption code to the terminal device so that the terminal device encrypts interactive data using the random encryption code after accessing the network. In another aspect, the method includes: transmitting a request for accessing a network to a gateway device, the request includes a device identifier of a terminal device; receiving a random encryption code fed back by the gateway device, the random encryption code is information for encrypting interactive data during the terminal device accessing the network; and encrypting interactive data with the random encryption code.

16 Claims, 4 Drawing Sheets

(51) Int. Cl.
  *H04L 12/66* (2006.01)
  *H04L 67/143* (2022.01)
  *H04L 69/28* (2022.01)
  *H04W 12/03* (2021.01)
  *H04L 9/06* (2006.01)

(52) U.S. Cl.
  CPC .......... *H04L 12/66* (2013.01); *H04L 63/0428* (2013.01); *H04L 63/0876* (2013.01); *H04L 67/143* (2013.01); *H04L 69/28* (2013.01); *H04W 12/03* (2021.01); *H04L 9/0866* (2013.01)

(58) Field of Classification Search
  CPC ..... H04L 63/08; H04L 63/0876; H04L 63/04; H04L 63/0428; H04W 12/03
  See application file for complete search history.

(56) References Cited

U.S. PATENT DOCUMENTS

| | | | | |
|---|---|---|---|---|
| 2010/0254533 | A1* | 10/2010 | McCullough | H04W 12/043 380/44 |
| 2014/0109184 | A1* | 4/2014 | Parker, II | H04L 49/252 726/3 |
| 2017/0055315 | A1* | 2/2017 | Lin | H04W 84/12 |
| 2019/0116179 | A1 | 4/2019 | Xu | |
| 2021/0021415 | A1* | 1/2021 | Fung | H04L 63/0428 |

FOREIGN PATENT DOCUMENTS

| | | |
|---|---|---|
| CN | 108112014 A | 6/2018 |
| CN | 109286932 A | 1/2019 |
| WO | 2013/038418 A1 | 3/2013 |
| WO | 2018/076740 A1 | 5/2018 |

* cited by examiner

METHOD, DEVICE AND SYSTEM FOR ENCRYPTING INTERACTIVE DATA

CROSS-REFERENCE TO RELATED APPLICATIONS

The present application claims the priority of Chinese Patent Application No. 201911042048.8, filed on Oct. 30, 2019, the contents of which are incorporated herein in their entirety by reference.

TECHNICAL FIELD

The present disclosure relates to the field of computer technology, and in particular, to a method for encrypting interactive data, a device for encrypting interactive data, and a system for encrypting interactive data.

BACKGROUND

With rapid development of communication transmission technology, the fourth generation (4G) mobile communication technology, Bluetooth technology, wireless fidelity (WIFI) technology, radio frequency identification (RFID) technology, and ZigBee technology have been developed in wireless communication technology, so that data transmission between a wireless terminal and a server is strongly supported, and convenience in using information technology by people is improved. However, a wireless network adopts medium such as microwave, atmosphere to perform data transmission, thus the data transmission faces serious security problems, phenomena such as data loss, data being stolen and data being tampered easily occurs, and a strict data encryption technology needs to be adopted to ensure security of the data transmission of the wireless network.

In encryption technologies, such as DES and AES encryption technologies, used in current data transmission process, data is encrypted through a complex encryption algorithm, and then the encrypted data is transmitted, and a receiver decrypts the encrypted data by using an algorithm the same as that for encryption after receiving the encrypted data, however, although the encryption algorithm used by these encryption technologies is complex, calculation principles thereof are well known, and key information which is used or information used for encryption are preset, therefore once these information are stolen, a steal party can decrypt and steal the data according to the known encryption algorithm.

SUMMARY

In a first aspect, the present disclosure provides a method for encrypting interactive data, which is applied to a gateway device, and includes: receiving a request for accessing a network from a terminal device, where the request for accessing the network includes a device identifier of the terminal device; generating a random encryption code corresponding to the terminal device according to the device identifier; and feeding back the random encryption code to the terminal device so that the terminal device encrypts interactive data with the random encryption code after accessing the network, where the interactive data is configured to be transmitted after being encrypted.

In a second aspect, the present disclosure provides a method for encrypting interactive data, which is applied to a terminal device, and includes: transmitting a request for accessing a network to a gateway device, where the request for accessing the network includes a device identifier of the terminal device; receiving a random encryption code fed back by the gateway device, where the random encryption code is information for encrypting interactive data by the terminal device after accessing the network; and encrypting interactive data with the random encryption code, where the interactive data is configured to be transmitted to the gateway device after being encrypted.

In a third aspect, the present disclosure provides a device for encrypting interactive data, including: a receiver, configured to receive a request for accessing a network from a terminal device, where the request for accessing the network includes a device identifier of the terminal device; a generator, configured to generate a random encryption code corresponding to the terminal device according to the device identifier obtained by the receiver; and a transmitter, configured to feed back the random encryption code to the terminal device so that the terminal device encrypts interactive data with the random encryption code after accessing the network, where the interactive data is configured to be transmitted after being encrypted.

In a fourth aspect, the present disclosure further provides a device for encrypting interactive data, including: a transmitter, configured to transmit a request for accessing a network to a gateway device, where the request for accessing the network includes a device identifier of the terminal device; a receiver, configured to receive a random encryption code fed back by the gateway device, where the random encryption code is information for encrypting interactive data by the terminal device after accessing the network; and an encryptor, configured to encrypt interactive data with the random encryption code obtained by the receiver, where the interactive data is configured to be transmitted to the gateway device after being encrypted.

In a fifth aspect, the present disclosure provides a gateway device, which includes the device for encrypting interactive data according to the third aspect.

In a sixth aspect, the present disclosure provides a terminal device, which includes the device for encrypting interactive data according to the fourth aspect.

In a seventh aspect, the present disclosure further provides a system for encrypting interactive data, which includes the gateway device in the fifth aspect and the terminal device in the sixth aspect.

In an eighth aspect, the present disclosure further provides a storage medium storing a computer program, and when the computer program being executed, the gateway device where the storage medium is located is controlled to execute the method for encrypting interactive data in the first aspect, or the terminal device where the storage medium is located is controlled to execute the method for encrypting interactive data in the second aspect.

DESCRIPTION OF DRAWINGS

Features and advantages of technical solutions of the present disclosure will become apparent from following detailed description of embodiments and implementations of the present disclosure. Drawings are only for purposes of illustrating exemplary embodiments and implementations and are not to be construed as limiting the present disclosure. Like reference signs in the drawings refer to like elements. In the drawings.

DESCRIPTION OF EMBODIMENTS

Figure 1:
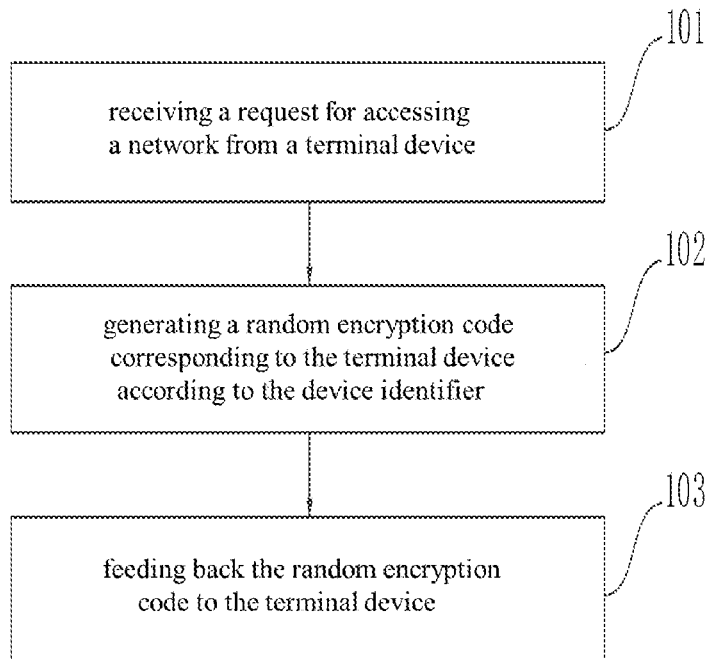
FIG. 1 shows a flowchart of a method for encrypting interactive data, which is used for a gateway device, according to an embodiment of the present disclosure.

Exemplary embodiments of the present disclosure will be described in more detail below with reference to accompanying drawings. While exemplary embodiments of the present disclosure are illustrated in the drawings, it should be understood that the present disclosure may be embodied in various forms and should not be limited by the embodiments set forth herein. The exemplary embodiments are provided for those skilled in the art understanding the present disclosure thoroughly and completely.

An embodiment of the present disclosure provides a method for encrypting interactive data, which is applied to a gateway device, and is used for encrypting interactive data by processing a request, for accessing a network, of a terminal device and generating an encryption code to be used by the terminal device after accessing the network. As shown in FIG. 1, the gateway device may perform following steps 101 to 103.

Step 101, receiving a request for accessing a network from a terminal device.

The request for accessing the network includes a device identifier of the terminal device.

When receiving the request transmitted by the terminal device, the gateway device needs to identify whether the request is the request for accessing the network, and if the request is not the request for accessing the network, other corresponding processing flows are called, which will not be specified in the embodiment. If the request is the request for accessing the network, a network access processing task needs to be called. The network access processing task extracts and records the device identifier in the request for accessing the network. After the device identifier being obtained is confirmed, the network access processing task will lock a working state of the gateway device to ensure that, during the network access processing task being executed, any request for accessing the network from another terminal device will not be processed.

Step 102, generating a random encryption code corresponding to the terminal device according to the device identifier.

In the embodiment, a specific generation manner of the random encryption code is not limited, and the generated random encryption code needs to be mapped to the device identifier, so that an association relationship is established between the device identifier and the random encryption code.

Meanwhile, after determining the association relationship between the random encryption code and the device identifier, the gateway device stores the random encryption code locally for decrypting the encrypted data subsequently transmitted by the terminal device.

Step 103, feeding back the random encryption code to the terminal device.

After the gateway device obtains the random encryption code and stores the random encryption code locally, the random encryption code is transmitted to the terminal device by the gateway device, so that the terminal device can encrypt interactive data with the random encryption code after accessing the network.

Based on foregoing implementation, it can be seen that, in the method for encrypting interactive data in the embodiment of the present disclosure, upon the gateway device receiving a request for accessing the network from the terminal device, a random encryption code is generated for the terminal device, so that the terminal device uses the random encryption code to encrypt interactive data to be transmitted after accessing the network. Therefore, the terminal device can encrypt interactive data with a different encryption code every time it has accessed the gateway device, a difficulty of intercepting and decrypting the transmitted data is raised, and a safety of data transmission is improved.

In some implementations, when performing step 101, the embodiment further includes: starting a network access processing task according to the request for accessing the network, generating a lock frame corresponding to the terminal device, and forbidding receiving any request for accessing the network from another terminal device during the network access processing task being executed; and transmitting the lock frame to the terminal device.

Starting the network access processing task means calling the network access processing task as that in step 101, and after the network access processing task is started, the lock frame for the terminal device is generated, where the lock frame indicates that the gateway device will not receive any request for accessing the network from another terminal device any more during the network access processing task being executed. A main purpose of the lock frame is to inform the terminal device that the request for accessing the network is accepted, so as to prevent the terminal device from repeatedly transmitting the request for accessing the network. Therefore, after generating the lock frame, the gateway device transmits it to the terminal device.

In some implementations, after starting the network access processing task, the gateway device may also create, in addition to generating the lock frame, an access timeout thread, where the access timeout thread is used to determine a completion of a processing on the current request for accessing the network within a specified time period, the specified time period is a preset time period threshold. When the access timeout thread receives completion information which indicates the completion of the processing on the current request for accessing the network, the gateway device recovers to receive any request for accessing the network from another terminal device; and when the access timeout thread receives no completion information within the specified time period, the gateway device also recovers to receive any request from another terminal device. That is to say, the access timeout thread is used to determine whether the gateway device has effectively processed the request for accessing the network within the specified time period, for example, the specified time period is one minute, and if the completion information which indicates the completion of the processing on the current request for accessing the network is received within 30 seconds, the access timeout thread may notify the gateway device to change the working state from a lock state to an unlock state, that is, any request for accessing the network from another terminal device can be received, and the access timeout thread is cancelled, and if no completion information which indicates the completion of the processing on the current request for accessing the network is received within one minute, the processing on the current request for accessing the network is considered to be failed, and in such case, the gateway device may also be notified to change the working state and cancel the access timeout thread. In such way, the gateway device can ensure that the processing on the request for accessing the network can be timely stopped when it fails, and any request for accessing the network from another terminal device can be received, so that a processing efficiency of the gateway device is improved.

In some implementations, the completion information which indicates the completion of the processing on the current request for accessing the network is fed back to the gateway device by the terminal device after the terminal device receives the random encryption code, and thus the gateway device waits for the terminal device to feed back the completion information after executing step 103, so as to ensure that the terminal device has received the random encryption code, and when receiving the completion information, the gateway device further needs to transmit the completion information to the access timeout thread, and the access timeout thread notifies the gateway device to change the working state and the access timeout thread is cancelled to end the processing on the current request for accessing the network.

In some implementations, the embodiment further includes: after performing step 102, searching a terminal device list for the device identifier of the terminal device; if the device identifier of the terminal device is not in the list, creating list information corresponding to the terminal device in the terminal device list, and adding the random encryption code to the list information; and if the device identifier of the terminal device exists in the list, updating the random encryption code in the list information corresponding to the terminal device.

The terminal device list is used for storing and recording terminal devices accessed to the gateway device, and in the terminal device list, device identifiers of the terminal devices and corresponding random encryption codes are mainly recorded, it should be noted that, each device identifier corresponds to a unique random encryption code, if the terminal device corresponding to the device identifier is in an on-network state, the corresponding random encryption code is an effective encryption code currently used, and if the terminal device corresponding to the device identifier is in an off-network state, the corresponding random encryption code is an encryption code used in a previous on-network state, and is invalid now.

Whether the currently processed request for accessing the network is from a terminal device which requests to access the gateway device for the first time may be determined by inquiring the terminal device list, if the currently processed request for accessing the network is from a terminal device which requests to access the gateway device for the first time, list information corresponding to the terminal device is created in the terminal device list, namely, the device identifier and the random encryption code of the terminal device are added; if the device identifier of the terminal device exists in the terminal device list, it only needs to update the encryption code corresponding to the device identifier into a new random encryption code.

Figure 2:
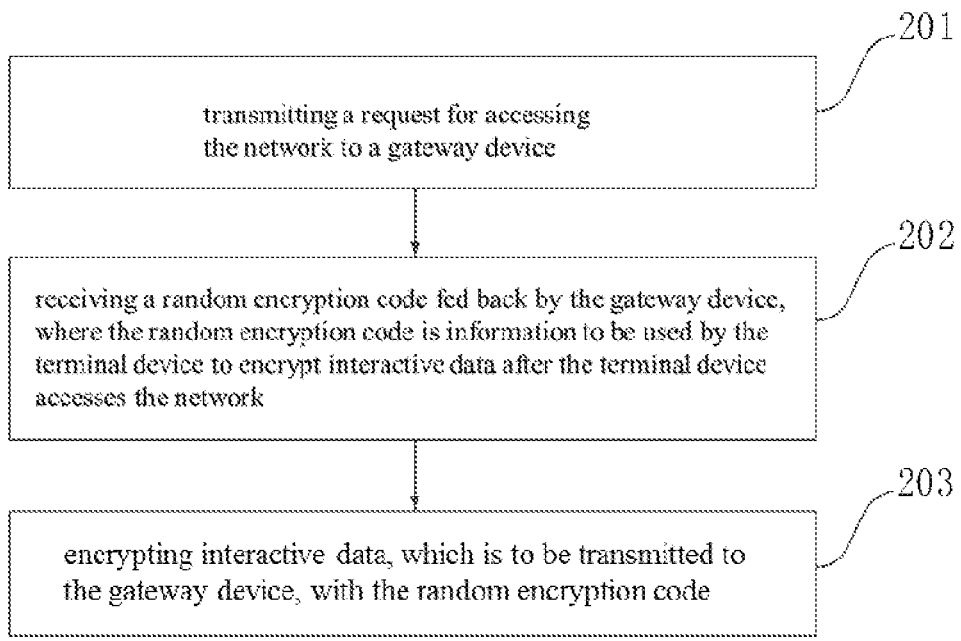
FIG. 2 shows a flowchart of a method for encrypting interactive data, which is used for a terminal device, according to an embodiment of the present disclosure.

The embodiment shown in FIG. 1 mainly illustrates specific steps performed by the gateway device in the method for encrypting interactive data, and specific steps performed by the terminal device in the method for encrypting interactive data are described below with reference to FIG. 2. As shown in FIG. 2, the terminal device may perform steps 201 to 203 as follows.

Step 201, transmitting a request for accessing the network to a gateway device.

The request for accessing the network includes a device identifier of the terminal device. The transmitting of the request for accessing the network is not limited to be automatically triggered by the terminal device, and for example, the request for accessing the network may be automatically transmitted when a network to which the gateway device can be connected is detected, or the transmitting of the request for accessing the network may be manually triggered by a user.

Step 202, receiving a random encryption code fed back by the gateway device, where the random encryption code is information to be used by the terminal device to encrypt interactive data after the terminal device accesses the network.

According to the embodiment shown in FIG. 1, when the gateway device processes the request for accessing the network, it generates and transmits a random encryption code. After transmitting the request for accessing the network to the gateway device, the terminal device receives the random encryption code in addition to information, indicating that the request for accessing the network has been accepted, fed back by the gateway device, and the random encryption code is used for encrypting interactive data after the terminal device accesses the network.

Step 203, encrypting interactive data with the random encryption code, where the interactive data is configured to be transmitted to the gateway device after being encrypted.

Based on the implementation shown in FIG. 2, it can be seen that, in the method for encrypting interactive data in the embodiment of the present disclosure, the terminal device receives a new random encryption code every time it accesses the network, and the new random encryption code is used for encrypting interactive data to be transmitted, so that it is ensured that the terminal device can encrypt interactive data with a different encryption code every time it has accessed the network, and a difficulty of intercepting and decrypting the transmitted data is increased.

In some implementations, the embodiment further includes: after performing step 201, determining whether a lock frame transmitted by the gateway device is received within a first time period, where the lock frame is used for indicating that the gateway device has accepted the request for accessing the network and is processing it; and if no lock frame is received within the first time period, retransmitting the request for accessing the network.

The gateway device transmits the lock frame to the terminal device after receiving the request for accessing the network, and notifies the terminal device that the request for accessing the network is accepted. If no lock frame is received by the terminal device after the terminal device transmits the request for accessing the network, the request for accessing the network needs to be transmitted again. If the terminal device receives the lock frame transmitted by the gateway device within the first time period, it indicates that the gateway device receives and starts to process the request for accessing the network transmitted by the terminal device, and the terminal device only needs to wait for the random encryption code transmitted by the gateway device, but if no lock frame is received by the terminal device, it indicates that the gateway device does not accept or process the request for accessing the network transmitted by the terminal device, and in such case, the terminal device needs to retransmit the request for accessing the network.

In some implementations, when the terminal device receives the lock frame transmitted by the gateway device, the specific implementation of step 202 includes: determining whether the random encryption code is received within a second time period; if no random encryption code is received within the second time period, retransmitting the request for accessing the network; if the random encryption code is received within the second time period, storing the random encryption code and transmitting the completion information which indicates the completion of the processing on the current request for accessing the network to the gateway device.

The second time period is used for limiting a time for receiving the random encryption code, when no random encryption code is received after exceeding the second time period, the terminal device considers that the processing of the gateway device fails, the request for accessing the network needs to be transmitted again, and when the random encryption code is received within the second time period, the random encryption code is stored to a specified position, the completion information which indicates the completion of the processing on the current request for accessing the network is fed back to the gateway device, and the access of the terminal device to the network is completed.

Step 203 in the embodiment shown in FIG. 2 is executed when interactive data is transmitted after the terminal device accesses the network. Specifically, each frame of data to be transmitted needs to be encrypted according to a preset format, where the preset format at least includes a gateway identifier bit, a password bit, a terminal identifier bit, and a data bit. An identifier of the gateway device is recorded in the gateway identifier bit, and is used for determining whether the frame of data is to be received by the gateway device or not when the gateway device receives the frame of data; information of a random encryption code is recorded in the password bit, where the information may be the random encryption code or a version number of the random encryption code, and is used for verifying whether the gateway device can decrypt the received frame of data with the random encryption code stored by the gateway device; the device identifier of the terminal device is recorded in the terminal identifier bit, and is used for searching, by the gateway device, the terminal device list for the corresponding random encryption code; the specific data content is recorded in the data bit. An example of data format in a practical application is as follows.

| Destination identifier | Version of encryption code | Source identifier | Data length | Data1 | Data2 | ... | Data n | Check bit |
|---|---|---|---|---|---|---|---|---|
| Gateway identifier or terminal identifier | Random encryption code or version number of encryption code | Gateway identifier or terminal identifier | n | 0Xxx | 0Xxx | ... | 0Xxx | |

The above data format may be used for interactive data between the terminal device and the gateway device. The destination identifier is the identifier of the receiver, and the source identifier is the identifier of the transmitter. The version number of the encryption code may be obtained by the gateway device from the terminal device list, and records updating times of the random encryption code corresponding to the terminal device, so that whether the encryption code is invalid or not is verified, and if the encryption code is invalid, the gateway device needs to inform the terminal device to re-access the network. For the data bit, "Xxx" represents a random encryption code, and "0" represents data content, and in practical applications, the embodiment does not limit the specific way of encrypting the content in the data bit with the random encryption code, and may be addition, subtraction, exclusive or, increment, decrement, and the like.

Figure 3:
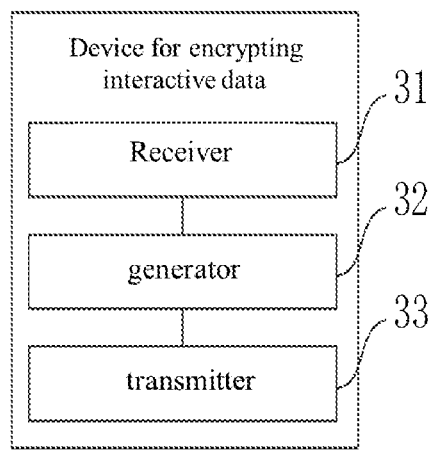
FIG. 3 shows a schematic structural diagram of a device for encrypting interactive data, which is used for a gateway device, according to an embodiment of the present disclosure.

As an implementation of the embodiment shown in FIG. 1, an embodiment of the present disclosure further provides a device for encrypting interactive data, which may be disposed in a gateway device. The embodiment of the device for encrypting interactive data corresponds to the foregoing embodiment of the method for encrypting interactive data, and for convenience of reading, details in the foregoing embodiment of the method are not described in detail again in this embodiment, but it should be clear that the device for encrypting interactive data in this embodiment can correspondingly implement all contents in the foregoing embodiment of the method for encrypting interactive data. Specifically, as shown in FIG. 3, the device includes: a receiver 31, configured to receive a request for accessing the network from a terminal device, where the request for accessing the network includes a device identifier of the terminal device; a generator 32, configured to generate a random encryption code corresponding to the terminal device according to the device identifier obtained by the receiver 31; a transmitter 33, configured to feed back the random encryption code obtained from the generator 32 to the terminal device, so that the terminal device encrypts interactive data with the random encryption code after accessing the network.

Figure 4:
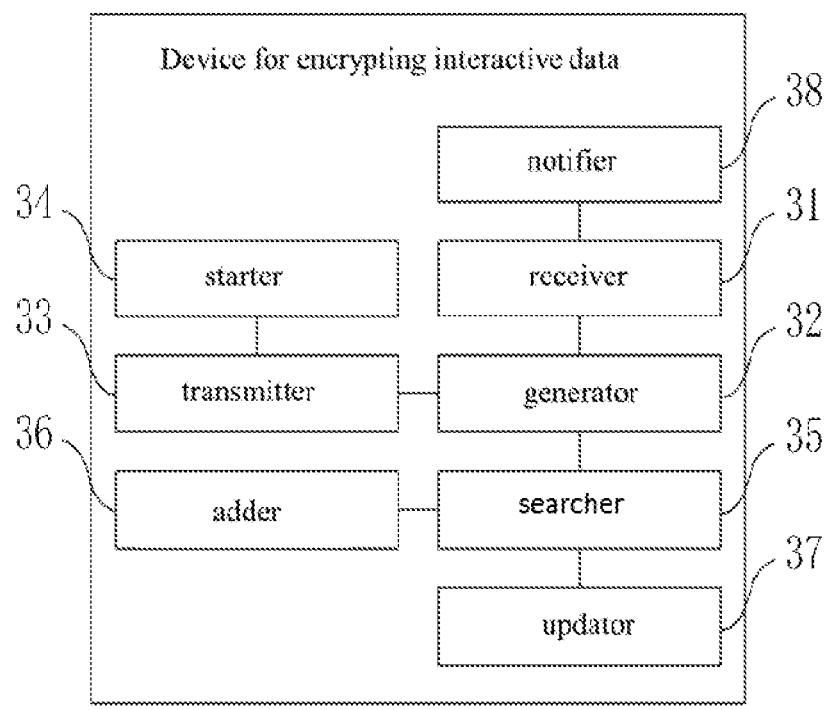
FIG. 4 shows a schematic structural diagram of a device for encrypting interactive data, which is used for a gateway device, according to an embodiment of the present disclosure.

In some implementations, as shown in FIG. 4, the device further includes: a starter 34, configured to start a network access processing task according to the request for accessing the network after the receiver 31 receives the request for accessing the network from the terminal device, generate a lock frame corresponding to the terminal device, and prohibit receiving any request for accessing the network from another terminal device during the network access processing task being executed; the transmitter 33 is further configured to transmit the lock frame generated by the starter 34 to the terminal device.

In some implementations, the starter 34 is further configured to, when starting the network access processing task, create an access timeout thread, where the access timeout thread is used to determine a completion of the processing on the request for accessing the network within a specified time period; the receiver 31 is further configured to, when the access timeout thread receives completion information which indicates the completion of the processing on the request for accessing the network, recover to receive any request for accessing the network from another terminal device; the receiver 31 is further configured to recover to receive any request for accessing the network from another terminal device when the access timeout thread receives no completion information which indicating indicates that the completion of the processing on the request for accessing the network within the specified time period.

In some implementations, as shown in FIG. 4, the device further includes: a searcher 35, configured to search the terminal device list for the device identifier after the generator 32 generates the random encryption code corresponding to the terminal device according to the device identifier; an adder 36, configured to, when the searcher 35 determines that the device identifier does not exist in the terminal device list, create list information corresponding to the terminal device in the terminal device list, and add the random encryption code to the list information; an updater 37, configured to update the random encryption code in the list information of the terminal device when the searcher 35 determines that the device identifier exists in the terminal device list.

In some implementations, as shown in FIG. 4, the receiver 31 is further configured to receive completion information fed back by the terminal device after the random encryption code is fed back to the terminal device, where the completion information is confirmation information indicating that the terminal device has received the random encryption code, and the device further includes: a notifier 38 configured to notify the completion information obtained by the receiver 31 to the access timeout thread.

The embodiment of the present disclosure further provides a gateway device, where the device for encrypting interactive data shown in FIG. 3 or FIG. 4 is disposed in the gateway device.

Figure 5:
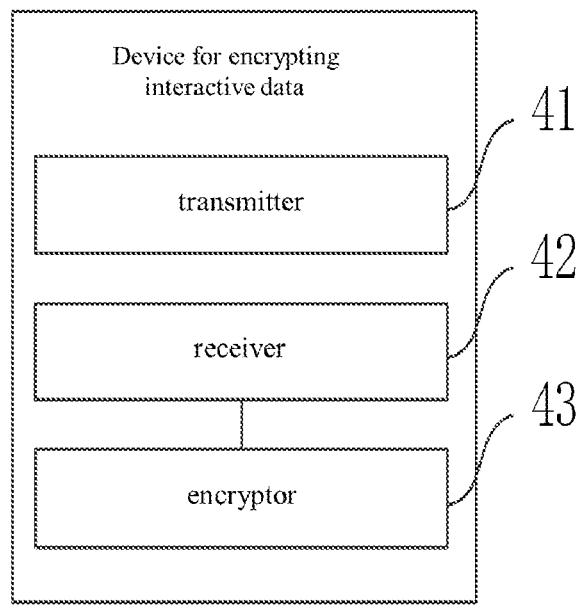
FIG. 5 shows a schematic structural diagram of a device for encrypting interactive data, which is used for a terminal device, according to an embodiment of the present disclosure.

As an implementation of the embodiment shown in FIG. 2, an embodiment of the present disclosure provides a device for encrypting interactive data, which may be disposed in a terminal device. The embodiment of the device for encrypting interactive data corresponds to the foregoing embodiment of the method for encrypting interactive data, and for convenience of reading, details in the foregoing embodiment of the method for encrypting interactive data are not described in detail again in this embodiment, but it should be clear that the device for encrypting interactive data in this embodiment can correspondingly implement all contents in the foregoing embodiment of the method for encrypting interactive data. As shown in FIG. 5, the device includes: a transmitter 41, configured to transmit a request for accessing the network to a gateway device, where the request for accessing the network includes a device identifier of the terminal device; a receiver 42, configured to receive a random encryption code fed back by the gateway device, where the random encryption code is information to be used by the terminal device to encrypt interactive data after the terminal device accesses the network; an encryptor 43, configured to encrypting interactive data with the random encryption code obtained by the receiver 42, where the interactive data is configured to be transmitted to the gateway device after being encrypted.

Figure 6:
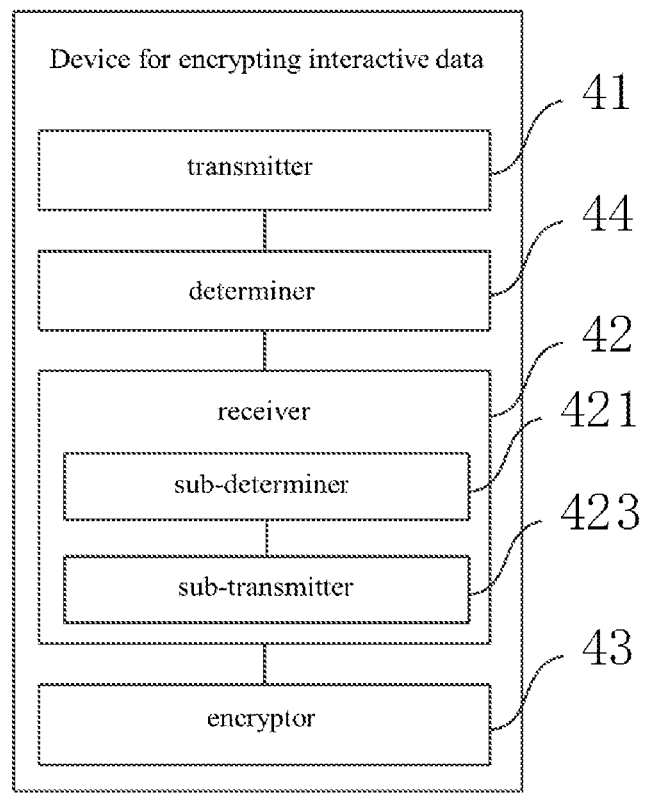
FIG. 6 shows a schematic structural diagram of a device for encrypting interactive data, which is used for a terminal device, according to an embodiment of the present disclosure.

In some implementations, as shown in FIG. 6, the device further includes: a determiner 44, configured to determine whether a lock frame transmitted by the gateway device is received within a first time period after the transmitter 41 transmits the request for accessing the network to the gateway device, where the lock frame is used to indicate that the gateway device has accepted the request for accessing the network; the transmitter 41 is further configured to retransmit the request for accessing the network if no lock frame is received by the determiner 44.

In some implementations, as shown in FIG. 6, the receiver 42 includes: a sub-determiner 421, configured to determine whether the random encryption code is received within a second time period when the determiner 44 receives the lock frame transmitted by the gateway device; a sub-transmitter 422, configured to retransmit the request for accessing the network when the sub-determiner 421 determines that no random encryption code is received within the second time period; the sub-transmitter 422 is further configured to store the random encryption code and transmit completion information to the gateway device when the sub-determiner 421 determines that the random encryption code is received within the second time period.

In some implementations, the encryptor 43 is further configured to encrypt interactive data with the random encryption code according to a preset format, where the preset format includes a gateway identifier bit, a password bit, a terminal identifier bit, and a data bit, and encrypted interactive data is obtained by encrypting interactive data in the data bit with the random encryption code.

An embodiment of the present disclosure further provides a terminal device, where the device for encrypting interactive data shown in FIG. 5 or FIG. 6 is disposed in the terminal device.

Figure 7:
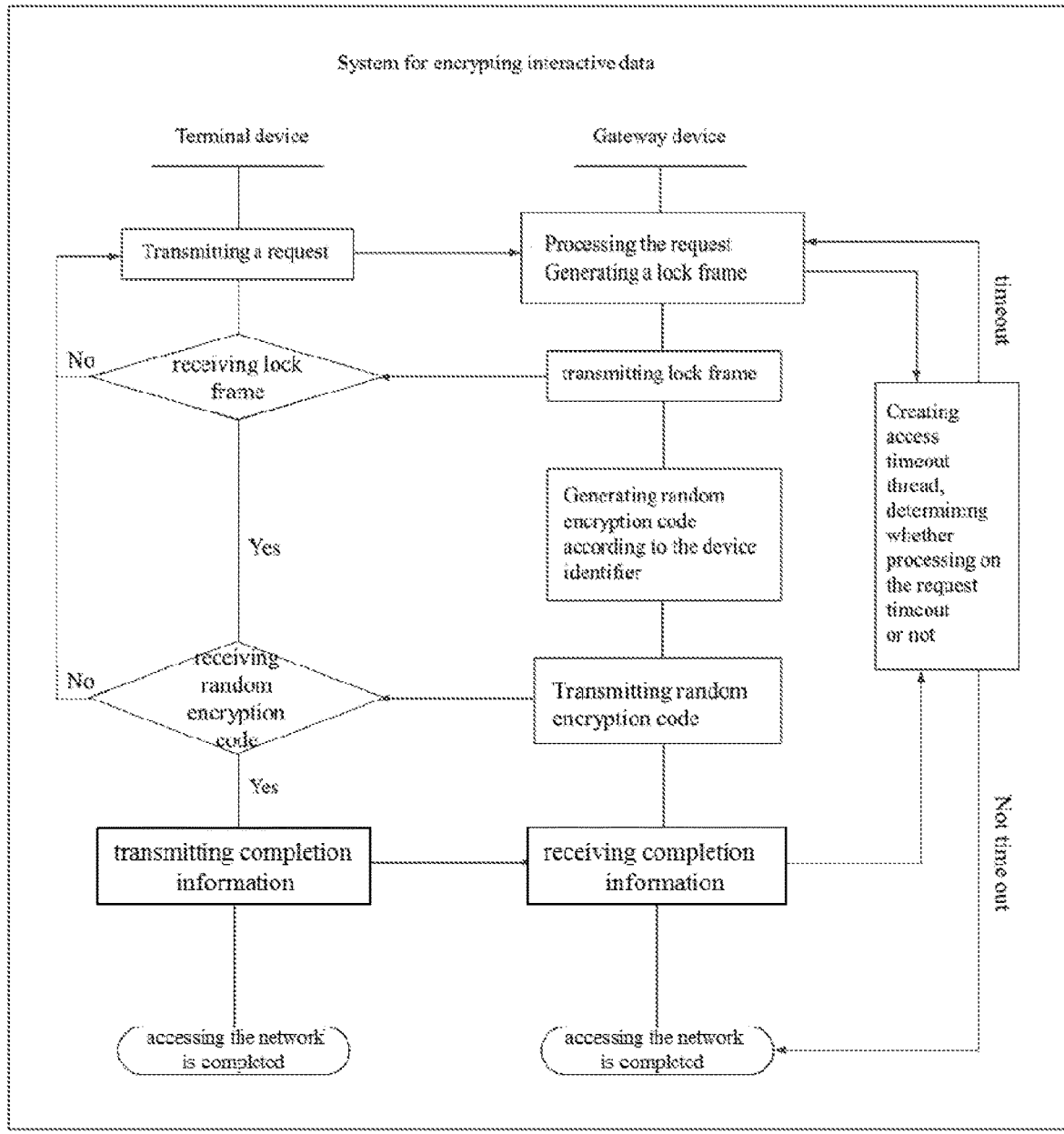
FIG. 7 shows an interaction diagram between a gateway device and a terminal device in a system for encrypting interactive data according to an embodiment of the present disclosure.

In embodiments shown in FIG. 1 and FIG. 2, specific steps performed by the gateway device and the terminal device when the terminal device accesses the network for a process of interactive data are respectively described, it can be seen that the security of data transmission can also be improved by a system formed of the gateway device and the terminal device. Therefore, a system for encrypting interactive data is further provided in an embodiment of the present disclosure, where the system includes at least one gateway device and at least one terminal device. The system for encrypting interactive data generates a random encryption code through the gateway device during processing a request for accessing a network from the terminal device, so that the terminal device can obtain a new random encryption code for encrypting interactive data to be transmitted every time the terminal device accesses the network. A specific interactive process between the gateway device and the terminal device in the system for encrypting interactive data during the terminal device accessing the network is shown in FIG. 7, and includes following steps 501 to 506.

Step 501, the terminal device transmits a request for accessing a network to the gateway device.

The terminal device may determine whether a lock frame is received within a preset time period, and if no lock frame is received, the request for accessing the network is transmitted again.

The gateway device may feedback the lock frame to the terminal device when receiving the request for accessing the network, so as to indicate that the request for accessing the network has been accepted.

Step 502, the gateway device processes the request for accessing the network, generates a lock frame and transmits the lock frame to the terminal device.

The gateway device firstly identifies the request for accessing the network, and if a request other than the request for accessing the network is received, the gateway device enters other processing flows; if the request for accessing the network is received, the lock frame is generated, a working state of the gateway device is set to be in a lock state, and receiving and processing of any request for accessing the network from another terminal device are forbidden.

Meanwhile, when the gateway device processes the request for accessing the network, an access timeout thread is created for determining whether the request for accessing the network is timeout.

Step 503, the gateway device generates a random encryption code according to identifier information of the terminal device.

The gateway device searches a terminal device list for the identifier information of the terminal device, so as to create or update a list information.

Step 504, after receiving the lock frame, the terminal device determines whether the random encryption code generated and transmitted by the gateway device is received within a preset time period.

If the random encryption code generated and transmitted by the gateway device is received within the preset time period, the terminal device feeds back completion information to the gateway device; if no random encryption code generated and transmitted by the gateway device is received within the present time period, the request for accessing the network is transmitted again.

Step 505, after receiving the completion information, the gateway device transmits the completion information to the access timeout thread so as to change the lock state of the gateway device to be an unlock state and start to receive the request for accessing the network from another terminal device.

Step 506, the terminal device encrypts interactive data with the random encryption code according to a preset format, where the interactive data is configured to be transmitted after being encrypted.

An embodiment of the present disclosure further provides a storage medium configured to store a computer program, where when the computer program is executed, the gateway device where the storage medium is located is controlled to execute the method for encrypting interactive data described in FIG. 1, or the terminal device where the storage medium is located is controlled to execute the method for encrypting interactive data described in FIG. 2.

In summary, with the method for encrypting interactive data, the device for encrypting interactive data, and the system for encrypting interactive data in embodiments of the present disclosure, during a process of a terminal device accessing a network provided by a gateway device, the gateway device generates a random encryption code for the terminal device based on identifier information of the terminal device, feeds the random encryption code back to the terminal device, and locally stores a correspondence between the random encryption code and the terminal device, so that the terminal device can encrypt interactive data with the random encryption code and transmit the encrypted interactive data to the gateway device. The security of data transmission can be improved by changing the encryption code to be used by the terminal device, and the change of the encryption code is realized by randomly generating the encryption code by the gateway device according to the identifier information of the terminal device every time the terminal device accesses the gateway device. In such way, for each terminal device, every time the terminal device access the network provided by the gateway device, a new random encryption code is obtained, and by encrypting interactive data to be transmitted with the random encryption code, even if the current encryption code is stolen, a new encryption code will be obtained the next time the terminal device accesses the gateway device, which increases the difficulty of data to be stolen, thereby improves the security of data transmission.

The above embodiments have been described with particular emphasis, and for those parts of an embodiment which are not described in detail, reference may be made to the related description of other embodiments.

It should be understood that relevant features of the method, the device and the system described above may be referenced to one another. In addition, the features in the above embodiments may be arbitrarily combined without being exclusive.

It can be clearly understood by those skilled in the art that, for convenience and simplicity of description, specific working processes of the above-described system, the device and elements thereof may refer to corresponding processes of the foregoing method, and are not described herein again.

The system, the device, and the elements thereof in the embodiments of the present disclosure may be implemented by software, hardware, or a combination thereof, and the hardware may be, for example, a computer, a processor, an integrated circuit, and the like. The method, the device and the system provided by the embodiments of the present disclosure are not inherently related to any particular computer, processor or integrated circuit, and various general purpose computers, processors or integrated circuits may be used in conjunction with the method, the device and the system provided by the embodiments of the present disclosure. Moreover, the present disclosure is not directed to any particular programming language. It will be appreciated that a variety of programming languages may be used to implement the present disclosure as described herein.

Further, the storage medium may include volatile storage medium, random access storage medium (RAM), and/or non-volatile storage medium, such as read only storage medium (ROM) or flash storage medium (flash RAM), among computer readable media, which may include at least one storage medium chip.

Those skilled in the art will appreciate that the technical solutions of the embodiments of the present disclosure may be provided as a method, a device, a system, or a computer program product. Accordingly, aspects of the embodiments of the present disclosure may be implemented by taking a form of hardware, software, or a combination thereof. Furthermore, aspects of the embodiments of the present disclosure may be implemented by taking a form of a computer program product embodied on one or more computer-usable storage media (including, but not limited to, disk storage, CD-ROM, optical storage, and so forth) having computer-usable program code embodied therein.

The present disclosure is described with reference to flowchart illustrations and/or block diagrams of the method, the device, the system, and the computer program product according to embodiments of the present disclosure. It will be understood that each flow and/or block of the flowchart illustrations and/or block diagrams, and any combination of flows and/or blocks in the flowchart illustrations and/or block diagrams, may be implemented by computer program instructions. These computer program instructions may be provided to a processor of a general purpose computer, a special purpose computer, an embedded processor, or any other programmable data processing device to produce a machine, such that the instructions, which are executed via the processor of the computer or any other programmable data processing device, create means for implementing functions specified in one or more flows in the flowchart illustrations and/or one or more blocks in the block diagrams.

These computer program instructions may also be stored in a computer-readable storage medium that can direct a computer or any other programmable data processing device to function in a particular manner, such that the instructions stored in the computer-readable storage medium produce an article including instruction means which implement functions specified in one or more flows in the flowchart illustrations and/or one or more blocks in the block diagrams.

These computer program instructions may also be loaded onto a computer or any other programmable data processing device to cause a series of operational steps to be performed on the computer or the other programmable data processing device to produce a computer implemented process such that the instructions which are executed on the computer or the other programmable device provide steps for implementing functions specified in one or more flows in the flowchart illustrations and/or one or more blocks in the block diagrams.

In a typical configuration, a computer includes one or more processors (CPUs), input/output interfaces, network interfaces, and a memory.

Memory is an example of a computer-readable medium, which includes permanent and non-permanent, removable and non-removable media, that may implement a storage of information by any method or technology. The information may be computer readable instructions, data structures, modules of a program, or any other data. Examples of computer storage media include, but are not limited to, phase-change random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile Disk (DVD) or other optical storage, magnetic cassette, magnetic tape storage or other magnetic storage device, or any other non-transmission medium, which may be used to store information that can be accessed by a computing device. As defined herein, a computer readable medium does not include transitory media such as a modulated data signal and a carrier wave.

It should be noted that the terms "include" "comprise" or any other variation thereof, are intended to cover a non-exclusive inclusion, such that the method, the device, or the system that contains a list of elements does not include only those elements but may include other elements not expressly listed or inherent to such method, device, or system. Without further limitation, an element defined by the phrase "including an . . . " does not exclude the presence of additional identical elements in the methods, device or system containing the element.

The foregoing is merely exemplary of embodiments of the present disclosure and is not intended to limit the present disclosure. Various modifications and variations to the disclosed embodiments will be apparent to those skilled in the art. Any modification, equivalent replacement, change, etc., made within the spirit and principle of the present disclosure should be considered to be within the scope of the present disclosure.

The invention claimed is:

1. A method for encrypting interactive data, applied to a gateway device, comprising:
receiving a request for accessing a network from a terminal device, the request for accessing the network comprises a device identifier of the terminal device;
generating a random encryption code corresponding to the terminal device according to the device identifier; and
feeding back the random encryption code to the terminal device, so that the terminal device encrypts interactive data with the random encryption code after accessing the network, wherein the interactive data is configured to be transmitted after being encrypted, and wherein the method further comprises:
after receiving the request for accessing the network from the terminal device, starting a network access processing task according to the request for accessing the network, generating a lock frame corresponding to the terminal device, and forbidding receiving any request for accessing the network from another terminal device during the network access processing task being executed; and
transmitting the lock frame to the terminal device.

2. The method of claim 1, further comprising:
after receiving the request for accessing the network from the terminal device, upon the network access processing task is started, creating an access timeout thread, the access timeout thread is configured for determining a completion of a processing on the request for accessing the network within a specified time;
upon the access timeout thread receives completion information which indicates the completion of the processing on the request for accessing the network, recovering to receive any request for accessing the network from another terminal device; and
in response to that the access timeout thread receives no completion information which indicates the completion of the processing on the request for accessing the network within the specified time period, recovering to receive any request for accessing the network from another terminal device.

3. The method of claim 1, further comprising:
after generating the random encryption code corresponding to the terminal device according to the device identifier, searching a terminal device list for the device identifier;
in response to that the device identifier does not exist in the terminal device list, creating list information corresponding to the terminal device in the terminal device list, and adding the random encryption code to the list information; and
in response to that the device identifier exists in the terminal device list, updating the random encryption code in the list information of the terminal device.

4. The method of claim 2, further comprising:
after the random encryption code is fed back to the terminal device, receiving the completion information fed back by the terminal device, the completion information is confirmation information indicating that the terminal device has received the random encryption code; and transmitting the completion information to the access timeout thread.

5. A method for encrypting interactive data, applied to a terminal device, comprising:
   transmitting a request for accessing a network to a gateway device, the request for accessing the network comprises a device identifier of the terminal device;
   receiving a random encryption code fed back by the gateway device, wherein the random encryption code is information to be used for encrypting interactive data by the terminal device after accessing the network; and
   encrypting interactive data with the random encryption code, wherein the interactive data is configured to be transmitted to the gateway device after being encrypted, and wherein
   encrypting interactive data with the random encryption code comprises:
   encrypting interactive data with the random encryption code according to a preset format, the preset format comprises a gateway identifier bit, a password bit, a terminal identifier bit and a data bit; and
   encrypting interactive data in the data bit with the random encryption code to obtain encrypted interactive data.

6. The method of claim 5, further comprising:
   after the request for accessing the network is transmitted to the gateway device, determining whether a lock frame transmitted by the gateway device is received or not within a first time period, the lock frame indicates that the gateway device has accepted the request for accessing the network; and
   in response to that no lock frame transmitted by the gateway device is received within the first time period, transmitting the request for accessing the network again.

7. The method of claim 6, further comprising:
   in response to that the lock frame transmitted by the gateway device is received within the first time period, determining whether the random encryption code is received within a second time period;
   in response to that no random encryption code is received within the second time period, retransmitting the request for accessing the network; and
   in response to that the random encryption code is received within the second time period, storing the random encryption code, and transmitting completion information to the gateway device.

8. A device for encrypting interactive data, comprising:
   a receiver, configured to receive a request for accessing a network from a terminal device, the request for accessing the network comprises a device identifier of the terminal device;
   a generator, configured to generate a random encryption code corresponding to the terminal device according to the device identifier obtained by the receiver; and
   a transmitter, configured to feed back the random encryption code to the terminal device so that the terminal device encrypts interactive data with the random encryption code after accessing the network, wherein the interactive data is configured to be transmitted after being encrypted, and wherein
   the device further comprises:
   a starter, configured to start a network access processing task according to the request for accessing the network after the receiver receives the request for accessing the network from the terminal device, generate a lock frame corresponding to the terminal device, and forbid receiving any request for accessing the network from another terminal device during the network access processing task being executed;
   the transmitter is further configured to transmit the lock frame generated by the starter to the terminal device.

9. The device of claim 8, wherein,
   the starter is further configured to create an access timeout thread upon the network access processing task is started, the access timeout thread is used for determining a completion of a processing on the request for accessing the network within a specified time period;
   the receiver is further configured to recover to receive any request for accessing the network from another terminal device upon the access timeout thread receives completion information which indicates the completion of the processing on the request for accessing the network; and
   the receiver is further configured to recover to receive any request for accessing the network from another terminal device in response to that no completion information which indicates the completion of the processing on the request for accessing the network is received within the specified time period.

10. The device of claim 8, further comprising:
   a searcher, configured to search a terminal device list for the device identifier after the generator generates the random encryption code corresponding to the terminal device according to the device identifier;
   an adder, configured to create list information corresponding to the terminal device in the terminal device list and add the random encryption code to the list information in response to that the searcher determines that the device identifier does not exist in the terminal device list; and
   an updater, configured to update the random encryption code in the list information of the terminal device in response to that the searcher determines that the device identifier exists in the terminal device list.

11. The device of claim 9, wherein the receiver is further configured to receive, after the random encryption code is fed back to the terminal device, completion information fed back by the terminal device, the completion information being confirmation information indicating that the terminal device has received the random encryption code, the device further comprising:
   a notifier, configured to transmit the completion information obtained by the receiver to the access timeout thread.

12. A device for encrypting interactive data, comprising:
   a transmitter, configured to transmit a request for accessing a network to a gateway device, the request for accessing the network includes a device identifier of the terminal device;
   a receiver, configured to receive a random encryption code fed back by the gateway device, the random encryption code is information to be used for encrypting interactive data by the terminal device after accessing the network; and
   an encryptor, configured to encrypt interactive data with the random encryption code obtained by the receiver, wherein the interactive data is configured to be transmitted to the gateway device after being encrypted, and wherein
   the encryptor is further configured to encrypt interactive data with the random encryption code according to a preset format, the preset format includes a gateway identifier bit, a password bit, a terminal identifier bit, and a data bit, and interactive data in the data bit is encrypted with the random encryption code to obtain encrypted interactive data.

13. The device of claim 12, further comprising:
a determiner, configured to determine whether a lock frame transmitted by the gateway device is received within a first time period after the transmitter transmits the request for accessing the network to the gateway device, the lock frame indicates that the gateway device has accepted the request for accessing the network;
the transmitter is further configured to retransmit the request for accessing the network in response to that the determiner determines that no lock frame is received within the first time period.

14. The device of claim 13, wherein the receiver comprises:
a sub-determiner, configured to determine whether the random encryption code is received within a second time period in response to that the determiner determines that the lock frame transmitted by the gateway device is received within the first time period; and
a sub-transmitter, configured to retransmit the request for accessing the network in response to that the sub-determiner determines that no random encryption code is received within the second time period;
the sub-transmitter is further configured to store the random encryption code and transmit completion information to the gateway device in response to that the sub-determiner determines that the random encryption code is received within the second time period.

15. A gateway device, comprising the device for encrypting interactive data according to claim 8.

16. A terminal device, comprising the device for encrypting interactive data according to claim 12.

* * * * *